US008728373B2

(12) United States Patent
O'Connor

(10) Patent No.: US 8,728,373 B2
(45) Date of Patent: May 20, 2014

(54) INDUSTRIAL FABRIC HAVING A THERMOCHROMIC SENSOR

(75) Inventor: Joseph G. O'Connor, Hopedale, MA (US)

(73) Assignee: Albany International Corp., Albany, NY (US)

( * ) Notice: Subject to any disclaimer, the term of this patent is extended or adjusted under 35 U.S.C. 154(b) by 866 days.

(21) Appl. No.: 11/725,682

(22) Filed: Mar. 20, 2007

(65) Prior Publication Data

US 2008/0233379 A1  Sep. 25, 2008

(51) Int. Cl.
*B29C 47/00* (2006.01)

(52) U.S. Cl.
USPC .......................................................... 264/211

(58) Field of Classification Search
USPC ................... 264/211; 427/446; 8/585
See application file for complete search history.

(56) References Cited

U.S. PATENT DOCUMENTS

| 4,156,365 | A | 5/1979 | Heinmets et al. |
| 4,681,791 | A | 7/1987 | Shibahashi et al. |
| 4,912,203 | A | 3/1990 | Kluger et al. |
| 4,959,430 | A | 9/1990 | Jonas et al. |
| 5,053,339 | A | 10/1991 | Patel |
| 5,085,607 | A | 2/1992 | Shibahashi et al. |
| 5,266,677 | A | 11/1993 | Samulski et al. |
| 5,279,768 | A | 1/1994 | Destryker et al. |
| 5,420,224 | A | 5/1995 | Samulski et al. |
| 5,503,583 | A | 4/1996 | Hippely et al. |
| 5,508,095 | A | 4/1996 | Allum et al. |
| 5,806,528 | A | 9/1998 | Magliochetti |
| 5,932,291 | A | 8/1999 | Sayers et al. |
| 5,976,621 | A | 11/1999 | Sayers et al. |
| 5,980,986 | A | 11/1999 | Sayers et al. |
| 5,989,651 | A | 11/1999 | Sayers et al. |
| 6,244,171 | B1 | 6/2001 | Kayser |
| 6,706,218 | B2 * | 3/2004 | Lucht et al. ................ 252/408.1 |
| 6,786,243 | B2 | 9/2004 | Luciano et al. |
| 2004/0057176 | A1 * | 3/2004 | Dhawan et al. ................ 361/62 |
| 2004/0266296 | A1 | 12/2004 | Martinsson et al. |

FOREIGN PATENT DOCUMENTS

| EP | 0 410 415 A | 1/1991 |
| EP | 1 221 500 A | 7/2002 |
| WO | WO 97/27360 | 7/1997 |
| WO | WO 98/07925 A | 2/1998 |
| WO | WO 2005/047576 A | 5/2005 |

OTHER PUBLICATIONS

The International Search Report issued by the European Patent Office on Feb. 2, 2009 for corresponding international application PCT/US2008/055457.

* cited by examiner

*Primary Examiner* — Larry Thrower
(74) *Attorney, Agent, or Firm* — Frommer Lawrence & Haug LLP; Ronald R. Santucci

(57) ABSTRACT

The present invention is directed to endless belts and fabrics incorporating thermochromic material such as polythiophene for use as a process control aid which can be used in thermal profiling of industrial thermal process, the industrial fabrics used in such a process, the manufacture of the industrial fabrics thereof and/or the products produced or carried thereon.

13 Claims, 1 Drawing Sheet

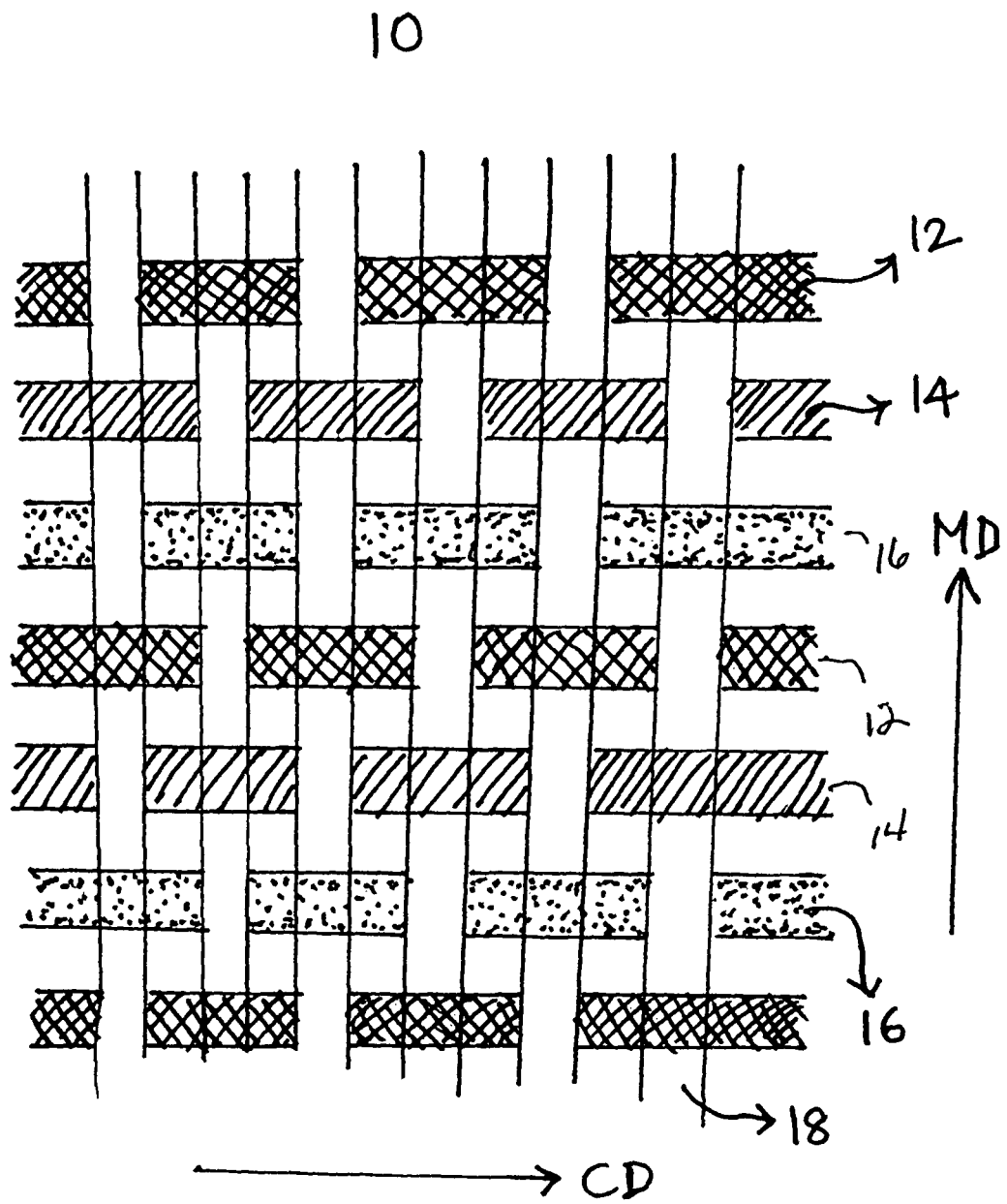

INDUSTRIAL FABRIC HAVING A THERMOCHROMIC SENSOR

BACKGROUND OF THE INVENTION

Field of the Invention

The present invention relates to industrial fabrics which utilize thermochromic materials for thermal profiling.

Industrial fabric means an endless belt such as one used as a forming fabric, press fabric, dryer fabric or process belt ("paper machine clothing"). It can also be a fabric used as an impression fabric, TAD fabric, an embossing fabric, a fabric used in the production of nonwoven by processes such as melt-blowing or a fabric used in textile finishing processes.

In general, during the papermaking process, for example, a cellulosic fibrous web is formed by depositing a fibrous slurry, that is, an aqueous dispersion of cellulose fibers, onto a moving forming fabric in a forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulosic fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press and dryer fabrics all take the form of endless loops on the paper machine and function in the manner of conveyors. It should further be appreciated that paper manufacture is a continuous process which proceeds at considerable speeds. That is to say, the fibrous slurry is continuously deposited onto the forming fabric in the forming section, while a newly manufactured paper sheet is continuously wound onto rolls after it exits from the dryer section.

In the use of an industrial fabric, often times it may be beneficial to the operator of the machine to have information concerning the operating conditions of the industrial fabric and/or the product that is being transported thereon, and most importantly the thermal conditions used to produce the product. Specifically, the operator may want to monitor the thermal profile of the fabric or belt in order to make sure that the thermal process producing the product is at a uniform temperature across the width of the machine and/or as well as in the running direction of the machine.

Thermochromic materials are known to exhibit change in color due to change in temperature. Their inherent nature to change color with change in temperature has found applications in many fields such as medical, automobile, storage, toy manufacturing etc.

U.S. Pat. No. 5,806,528 is directed to a device and method for measuring and providing a visual indication of the temperature of a fluid prior to its delivery to a patient. The temperature sensing device consists of a thermochromic liquid crystalline polymer extruded or otherwise molded into the fluid delivery tube. The polymer is capable of exhibiting at least one color change in response to a change in temperature.

U.S. Pat. No. 5,503,583 teaches a toy painted with paint containing thermochromic material which changes color as the temperature of the toy varies. Selected portions of the toy are painted with the thermochromic material to provide a variety of patterns, designs, numbers, letters or other indicia which change color in response to temperature variations. In addition, different portions of the toy may be painted with different paints containing different colored thermochromic materials.

U.S. Pat. No. 5,085,607 relates to a toy set having at least one section which bears a color memory dye of an electron-supplying organic coloring compound, an electron accepting compound and an ester. The color memory dye assumes a first color below $t_1$ (degree C.) and a second color above $t_2$ (degree C.). Both the first and second colors can be displayed between $t_1$ and $t_2$. For the purpose of determining the proper temperature range for a color characteristic, temperature-sensitive visual indicators are provided, which are reversible thermochromatic materials comprising a reversible thermochromatic pigment in the form of a resin solid solution.

U.S. Pat. No. 5,053,339 describes a color changing device for monitoring the time-temperature storage history, i.e. shelf life, of perishable products. The device is constructed of an activator tape, containing an activator composition matrix, an indicating tape, containing an indicating composition matrix and an optional barrier matrix between the activator tape and the indicating tape. The activating composition, e.g. an organic acid such as citric acid, diffuses through the barrier and/or indicating matrix to continuously contact the indicating composition, e.g. an acid-base dye indicator, to produce a visually observable color change at the temperature being monitored. The color intensifies with time and temperature, as more activator composition diffuses into the indicating matrix. The matrices are water-impermeable and the device preferably possesses activation energy and rate constant values for the color change which are substantially the same as those for product decay. This allows accurate and continuously observable monitoring of the shelf-life of the perishable product to which the device is adhered to.

U.S. Pat. No. 4,156,365 relates to food temperature vessels or other utensils comprising a thermochromic layer at a surface thereof indicating temperature of the food content of the vessel within a safe range above 60° C. and below 70° C. corresponding to achievement of safety conditions by raising the food content above the minimum temperature of the range to produce reversible protein denaturation in certain microorganisms to limit sporulation, and below a limit corresponding to irreversible protein denaturation and tissue injury of the tongue, lips or throat tissues of the user on the upper end of the range. The thermochromic layer goes through a transition from red to black across the range.

U.S. Pat. No. 6,706,218 is directed to a thermochromic polymer-based temperature indicator composition which comprises a polythiophene and a carrier medium. The composition is characterized in that the polythiophene is present in the medium in an amount of about 0.05 to about 5.0% by weight based on the total weight of the composition. The structure of the compound is designed such that when the composition is placed in a heat-exchange relationship with an article, the composition will exhibit a color change when a design temperature or a temperature beyond the design temperature is reached in the article.

U.S. Pat. Nos. 5,420,224 and 5,266,677 relate to a thiophene based polymer such as poly (arylene ether) ketones, polyamides, and poly(benzoxazoles) that contain thiophene rings within the aromatic polymer backbone and fibers, films, and other articles formed therefrom.

However, few thermochromic materials are suitable for use in industrial fabrics used in, for example, the paper industry because of poor extrudability (thermochromic material breaks down during extrusion), reversibility of color at the needed temperature, survivability in the harsh chemical and thermal environment, changeability in the visible wavelength and intensity and contrast to the colors of the industrial fabric using yarns or fibers containing these materials.

Accordingly, thermochromic material used with regard to industrial fabrics is very limited. For example, WO 97/27360 describes an industrial belt comprising a polymer matrix which comprises a thermochromic material. The thermochromic material is incorporated into the fabric structure in several ways such as, extruding the yarn from a polymer matrix containing the thermochromic material, filling hollow fibers with thermochromic dye in a microencapsulated form, or providing the material in the sheath of a sheath-core yarn. Different materials giving color transitions at different temperatures are also used for blending into the polymer matrix and extrusion into filaments and yarns.

Accordingly, the prior art is relatively silent about how to use thermochromic materials in industrial fabrics, and which materials are usable in such industrial fabrics.

The present invention describes an industrial fabric having yarns made of or coated with thermochromic materials which act as a process control aid for the process in which the industrial fabrics are used and also in their fabrication.

SUMMARY OF THE INVENTION

It is an object of the invention to provide an industrial fabric or components thereof incorporating thermochromic materials such as polythiophene for use as a process control aid.

It is yet another object of the invention to provide a means of monitoring the degree of thermal energy experienced by various regions of an industrial fabric or belt.

It is a further object of the invention to provide a means to monitor the cure temperature for fabrics or belts in belt production such as monitoring the thermal profiles and variations thereof in producing fabrics such as heatsetting or drying and curing of coatings.

Other objects of the invention will become apparent from the following disclosure.

The invention relates to an industrial fabric including but not limited to those used in papermaking such as forming, pressing or dryer fabrics and other industrial applications. The fabrics may be formed of, for example, monofilaments containing or coated with reversible thermochromic polymer, particularly, such as polythiophene. Reversible thermochromic materials change color with change in temperature, and every thermochromic polymer or material has a thermochromic transition temperature where it exhibits change in color. The transition temperature of this change can be modified by changing the length and/or orientation or direction of the molecules in the side chain. In this manner the temperature of the fabric can be monitored. For example, thermal profiling, particularly the non-uniformity in the profile, can be observed or monitored either by detection by eye or with the aid of an imaging technique. The fabric itself becomes an active sensor, which can be used for process monitoring or control purposes.

The present invention will now be described in more complete detail with reference being made to the drawing figure, which is identified below.

BRIEF DESCRIPTION OF THE DRAWINGS

For a more complete understanding of the invention, reference is made to the following description and accompanying drawing in which:

FIG. 1 shows an industrial fabric according to the present invention.

DETAILED DESCRIPTION OF THE PREFERRED EMBODIMENTS

A thermochromic sensor would be a material that responds to its thermal environment by changing color. Such materials would have a number of practical applications for industrial fabrics used in the papermaking and other industries. Polythiophenes are known to be thermochromic, even though most of the interest has been in their electrical conductivity properties.

The technology relative to the present invention employs thiophene polymers with side chains. The side chains are important in determining the temperature transition. By varying the length and distribution of side chains, the thermochromic transition temperature of the polymer can be designed. For example, transition temperatures can range from below room temperature to as high as 180° C. The transition can be tailored to occur over a narrow scale, approximately a 10° C. range or over a broader range of 20° C. or more. It is reversible and the change can be very rapid. A unique feature of polythiophenes is that the color transition is a result of a conformational change in the polymer, which distinguishes the mechanism of the color change from other thermochromic materials such as dyes, liquid crystals or metallic complexes. Due to the fact that the conformational change is a physical effect, the color change is reversible and fast. Controlling regioregularity, i.e., how sharp the temperature transition is, may have its advantages depending upon the application sought. Moreover, while the durability of thermochromic coatings may have its own issues; this is not meant to preclude the use of reversible thermochromic material or coatings in industrial fibers, either on the yarns, fibers or monofilaments, shaped filaments or fibers directly on the surface thereof or in extrudable resins having it as a component thereof.

Ideally, incorporation of the thermochromic material into fibers, yarns or films ensures the presence of the thermochromic material as it wears. However, most thermochromic materials cannot survive extrusion conditions, except for high temperature thermochromic materials, which have relatively limited applications in the industrial fabric area. Thiophenes are very thermally stable, and have successfully been extruded by the inventors into thermoplastic materials, including polyethylene terephthalate PET. For example, 0.35 mm monofilament was produced by extruding a 105° thermochromic polymer. As the fiber exited the draw ovens, a sharp transition from the yellow high temperature color to the burgundy low (ambient) temperature color could be observed. This observation verified both the reversibility of the color change, as it entered and exited the oven zones, and the speed of the color transition.

The invention is directed to the use of such material as a component of an industrial fabric. As one example, a stripe can be created in the CD by using the thermochromic polymer content monofilament yarns in the weave or in a portion thereof. As illustrated in FIG. 1, fabric 10 which is formed of CD yarns 12, 14, 16 and MD yarns 18 can be constructed with multiple monofilament yarn stripes in CD which can be easily sequenced with thermochromic polymers at, for example, different temperature transitions graduating from, e.g. one centered at 95° C. (16) followed by one centered at 105° C. (14) followed by one centered at 115° C. (12), as one example. The length in the running direction or MD of the stripe can be made of sufficient length for detection in operation of the fabric by eye or with the aid of an imaging technique, e.g. using strobes to view fabrics or cameras or video devices. In other words, each CD stripe will contain at least one or preferably more yarns which contain the thermochromic polymer material. In this way, the thermal profile and, particularly the non-uniformity in the profile, can be observed or monitored.

For example, a coating containing thiophene with a thermochromic transition at 105° C., was applied in a CD stripe with a spray applicator to a dryer fabric. An overcoat of a polyurethane was applied to encapsulate the thermochromic coating. The sample fabric was placed in a Mathis oven (standard laboratory oven) where exposure to temperature and time can be easily programmed and controlled. The fabric was exposed to a temperature of 85° C. for one minute initially and then the temperature was raised in 5° C. increments. The thermochromic transition was observed to begin at about 100° C. and was complete by 110° C.

The fabric in the present invention becomes an active sensor in operation. Many other concepts utilizing thermochromic elements can be derived from this example. Also, while a woven fabric is illustrated, other fabrics having thermochromic elements are envisioned such as those of aforementioned and may also be nonwoven structures such as MD and/or CD yarn arrays, netting, knits, extended meshes, spiral links or laminates thereof.

While the term "fabric" has been referred to herein, the structure according to the present invention may comprise yarns or films, or even in the form of a filamentary materials selected from the group consisting of monofilaments, multifilament fibers, bicomponent (sheath/core) fibers, or even staple fibers depending upon the application, any or all of which contain the thermochromic material. The structure may have one or more layers any or all of which may contain a material containing the thermochromic material. For example, a thin layer of the thermochromic material can be produced by either using a bicomponent yarn extruded in a sheath-core form, with the sheath and core formed from the same or different materials. Alternately, a thin layer of the thermochromic material may be coated on the yarn by means known to those skilled in the art, including, but not limited to, dip or bath coating, spraying, jetting, blade coating, screen printing, dye application or other means suitable for the purpose. Though a thick layer of coating can be achieved using these techniques, a thin layer is preferred in the present invention. As a further alternative, the fabric itself can be coated with a thin layer of thermochromic material using any of the techniques mentioned above.

The color transition for a thiophene polymer is an outcome of the chemical structure and is intrinsic to the material. Typically, the transition from one color to the next as the temperature is raised is through the conformational change of the polymer side chains. However, the option exists to tune the transition color by adding a pigment with the polythiophene during extrusion in the case of a monofilament. For instance, addition of a blue pigment would give a final transition to a green shade, starting from a purple-red as the temperature is increased past the thermochromic transition temperature.

Also, thermochromic materials can be used for online process control for an industrial fabric such as an aid to monitor cure temperature for coatings in fabric or belt production.

Modifications to the above would be obvious to those of ordinary skill in the art, but would not bring the invention so modified beyond the scope of the present invention. The claims to follow should be construed to cover such situations.

I claim:

1. A method of forming an industrial fabric taken from the group consisting of forming fabrics, press fabrics, dryer fabrics and process belts used in papermaking, impression or embossing fabrics, through-air-dryer (TAD) fabrics, and fabrics used in the production of nonwovens, the method comprising the step of:
incorporating a plurality of fibers or yarns in a pattern in the form of stripes with sequenced thermochromic polymers having different graduated temperature transitions arranged in a cross machine direction (CD) of the fabric, the plurality of fibers or yarns comprising thermochromic polymer materials and having a plurality of thermochromic transition temperatures, wherein the thermochromic polymer materials comprise polythiophene, wherein the plurality of fibers or yarns incorporate polythiophene as a component thereof or coating thereon, and the stripes are created in the CD by using the plurality of fibers or yarns incorporating polythiophene in a weave of the industrial fabric, and the fabric is used as a process control aid.

2. The method according to claim 1, wherein said thermochromic material is formed as part of the fibers, yarn or film or as a coating.

3. The method according to claim 2, wherein said thermochromic material is in the form of a filamentary material selected from the group consisting of monofilaments, multifilament fibers, bicomponent fibers, and staple fibers.

4. The method according to claim 1, wherein said pattern is in the form of stripes arranged in a cross machine direction (CD) in an increasing order of their thermochromic transition temperatures.

5. The method according to claim 1, wherein said pattern is in the form of stripes arranged in a cross machine direction (CD) in a decreasing order of their thermochromic transition temperatures.

6. The method according to claim 1, wherein said pattern is in the form of stripes arranged in a cross machine direction (CD) in an order other than increasing or decreasing thermochromic transition temperatures.

7. The fabric according to claim 1, wherein the transition color of the thermochromic polymer is modified by using a color pigment.

8. The method according to claim 1 wherein the thermochromic transitional temperatures are in a predetermined range.

9. The method according to claim 1, wherein said yarn is a bicomponent yarn extruded in a sheath-core form.

10. The method according to claim 9, wherein the sheath and core are formed from the same or different materials.

11. The method according to claim 2, wherein the coating of thermochromic material is applied via one of dip or bath coating, spraying, jetting, blade coating, screen printing, and dye application.

12. The method according to claim 1, further comprising the step of applying a coating of thermochromic material over said fabric.

13. The method according to claim 12, wherein the coating of thermochromic material is applied via one of dip or bath coating, spraying, jetting, blade coating, screen printing, and dye application.

* * * * *